May 17, 1927.
D. E. GAMBLE
1,628,877
FRICTION CLUTCH
Filed Aug. 27, 1923
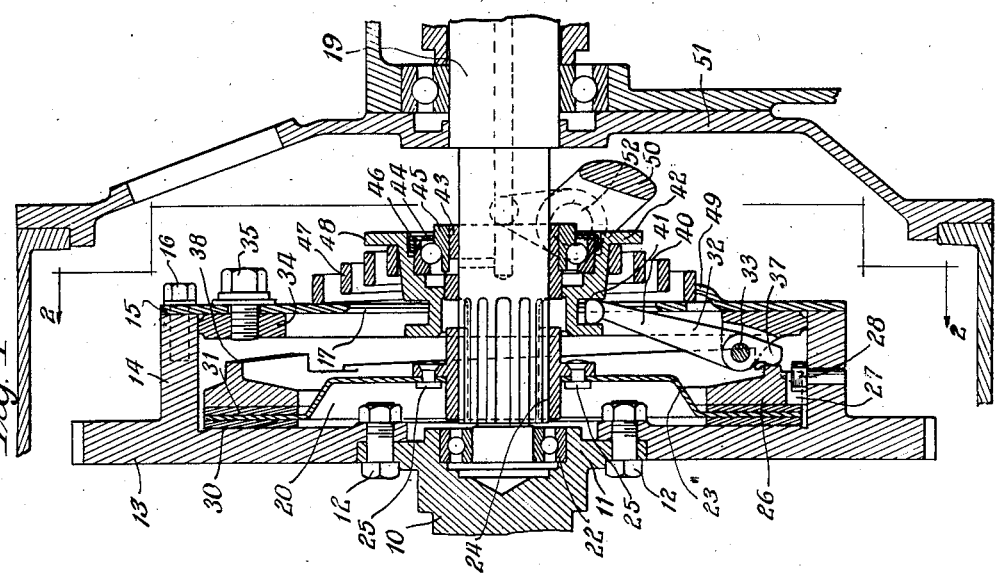
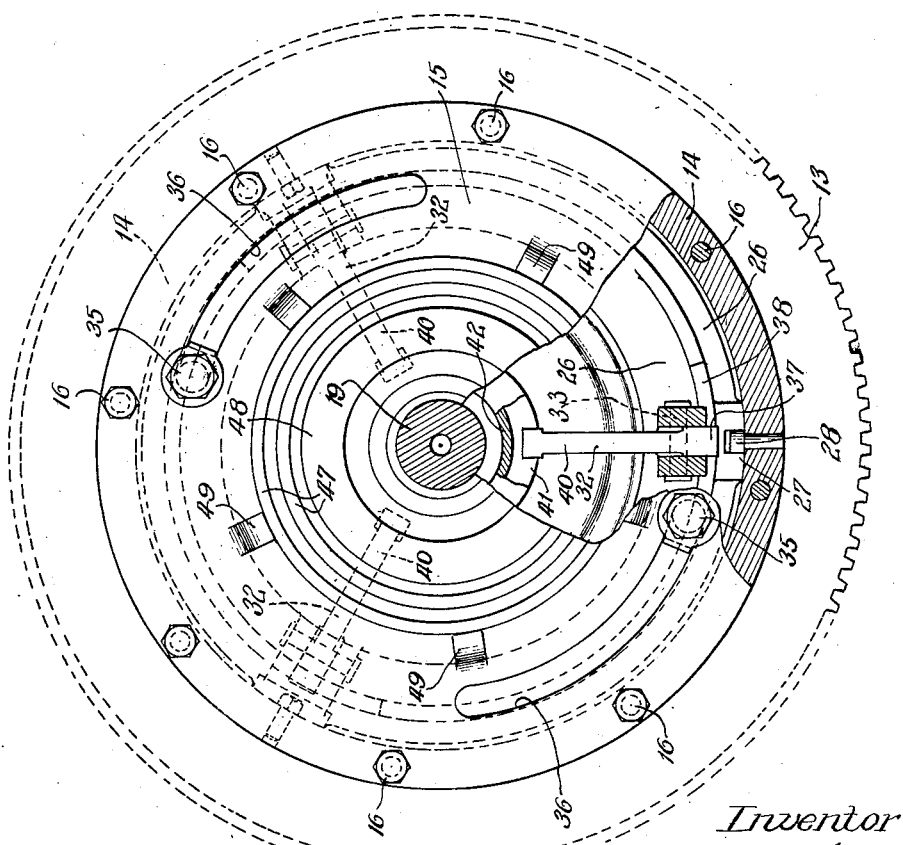
Inventor:
David E. Gamble
By: Wm. O. Bell
Atty.

Patented May 17, 1927.

1,628,877

UNITED STATES PATENT OFFICE.

DAVID E. GAMBLE, OF CHICAGO, ILLINOIS, ASSIGNOR TO THE BORG & BECK COMPANY, OF CHICAGO, ILLINOIS, A CORPORATION OF ILLINOIS.

FRICTION CLUTCH.

Application filed August 27, 1923. Serial No. 659,482.

My invention relates to a friction clutch, and more particularly to a friction clutch adapted to be employed in connection with motor driven vehicles and the like.

My invention contemplates a friction clutch having a novel arrangement of parts and certain other novel features, which together give to the friction clutch the attributes of compactness and ease of operation.

It is desirable that friction clutches employed in connection with motor driven vehicles and the like be of minimum weight and that the inertia of the rotating parts thereof affect the driven shaft to a very small extent when the driving and driven elements of the clutch are thrown out of frictional engagement.

An object of my invention is to provide an improved friction clutch for rotating a driven shaft, the friction clutch having only a single member thereof secured to the driven shaft to rotate therewith.

Other objects of my invention will become apparent as the detail description progresses, reference being had to the accompanying drawings, wherein—

Fig. 1 is a longitudinal section through a friction clutch embodying the novel features of my invention, and Fig. 2 is a section taken on line 2—2 of Fig. 1 with portions broken away.

Similar characters of reference designate similar parts through the several views.

In the drawing, the reference character 10 designates the driving end of a crank shaft, such as is usually employed in motor driven vehicles or the like. The crank shaft 10 is provided with an annular flange 11 to which is rigidly secured by means of bolts 12 a fly wheel 13. The fly wheel 13 has an annular flange 14 formed integrally therewith and projecting longitudinally from one face thereof. A circular plate or disk 15, which rests against the outer edge of the annular flange 14, and is secured thereto by bolts 16, is centrally apertured as at 17 to permit a driven shaft 19 to project into a chamber 20 formed by means of the fly wheel 13, annular flange 14 and disk 15. The inner end of the driven shaft 19 is rotatably journaled in a pilot bearing 22 disposed in the driving end of the crank shaft 10, the axes of the crank shaft 10 and driven shaft 19 being coincident. A friction disk 23, disposed within the chamber 20, is splined to the driven shaft 19 by means of a sleeve 24 to which the friction disk 23 is rigidly secured by rivets 25. It is apparent that the driven shaft 19 will rotate with the friction disk 23 and that the friction disk 23 may be moved longitudinally of the driven shaft 19. Disposed concentrically with the friction disk 23 and also disposed within the chamber 20 is a thrust ring 26 having a plurality of transverse slots 27 adapted to receive the heads of a plurality of pins 28 pressed or driven into the annular flange 14. The pins 28 cause the thrust ring 26 to rotate with the fly wheel 13, but permit the thrust ring to be moved longitudinally of the fly wheel 13 and driven shaft 19. A pair of friction rings 30 and 31 are provided, the friction ring 30 being disposed between the outer face of the fly wheel 13 and the friction disk 23, and the friction ring 31 being disposed between the friction disk 23 and the thrust ring 26. As is well known to those skilled in the art, if the thrust ring 26 is forced toward the fly wheel 13, the friction material 30 and 31 will frictionally engage the fly wheel 13, friction disk 23 and thrust ring 26 to provide a driving engagement between the crank shaft 10 and the driven shaft 19.

To force the thrust ring 26 in a direction toward the fly wheel 13 so as to effect the aforementioned driving engagement between the crank shaft 10 and driven shaft 19 I provide a plurality of levers 32 which are arranged radially with respect to the coincident axes of the crank shaft 10 and driven shaft 19. Each of the levers 32 is pivotally secured intermediate its ends by a pin 33 to a ring 34. The ring 34 is secured to the disk 15 by a plurality of bolts 35, which pass through arcuate slots 36 formed in the disk 15 and are threaded into the ring 34. It is apparent that the ring 34 may be angularly adjusted with respect to the disk 15 and the thrust ring 26 so that the outwardly extending arms 37 of the levers 32 may be adjusted angularly of the cammed thrust seats 38 formed upon the thrust ring 26. The purpose of this construction will presently appear.

The inwardly extending arm 40 of each of the levers 32 is inclined away from the flywheel 13, and rides in an annular groove 41 turned in a collar 42 arranged concentrically with the axis of the driven shaft 19. The collar 42 is rotatably journaled upon a clutch throw-out sleeve 43 which is in turn rotatably journaled upon the driven shaft 19 cut in close contact therewith, a ball bearing 44 having inner and outer races 45 and 46 respectively being interposed between the collar 42 and the sleeve 43. It will be noted that the collar 42 is disposed partially within and partially without the chamber 20, thus permitting it to engage the levers 32 which are within the chamber, and to cooperate with a spiral spring 47 which is without the chamber. The spiral spring 47 is in the form of a flattened cone, and is disposed substantially parallel with the levers 32 between an annular flange 48 formed integral with the collar 42 and a plurality of shoulders 49 struck out from the disk 15. The spiral spring 47 yieldingly forces the collar 42 to the right (Fig. 1) thereby causing the outwardly extending arms 37 of the levers 32 to force the thrust ring 26 in a direction toward the fly wheel 13, which results, as aforesaid, in a driving engagement between the crank shaft 10 and the driven shaft 19. By disposing the elements as just described a very compact arrangement is achieved.

The thrust seats 38 which are engaged by the arms 37 of the levers 32 are inclined with respect to any transverse plane passing through the friction clutch. If the ring 34 is adjusted angularly in a clockwise direction (Fig. 2) with respect to the disk 15, and thrust ring 26, the arms 37 of the levers 32 may be brought to any desired positions relative to the thrust seats 38. An adjustment of the ring 34 in the manner and direction described will cause the distance between the thrust seat engaging surface of any one of the arms 37 and the friction ring engaging surface of the thrust ring 26 to be increased. This construction will permit the operator to adjust the clutch whenever any of the friction surfaces of any of the frictional engaging members of the clutch wear away.

To release the fly wheel 13, friction rings 30 and 31, friction disk 23 and thrust ring 26 from driving engagement with one another, a forked throw-out lever 50 pivotally secured in the crank case 51 as at 52 may be manually operated to engage and move the sleeve 43 to the left (Fig. 1). Movement of the sleeve 43 in the manner described will cause the collar 42 to move in the same direction and the movement of the sleeve 43 will be imparted to the collar 42 through the combined thrust and radial bearing 44. The resulting displacement of the collar 42 will cause the arms 37 of the levers 32 to draw away from the thrust seats 38, thus breaking the driving connection between the crank shaft 10 and driven shaft 19. The sleeve 43, which rotates with the shaft 19 when the clutch is in, will now be held stationary by the pressure of the throw-out lever 50 and will brake the shaft 19, bringing it to a quick stop.

In the operation of the device, the spiral spring 47 will at all times yieldingly hold the levers 32 in positions wherein they cause the several friction members of the clutch to form a driving connection between the crank shaft and driven shaft 19, unless the operator desires to throw out the clutch, which he accomplishes by means of the forked lever 50 in a manner described above and well known to those skilled in the art.

It will be noted that in the construction of my improved friction clutch only a single rotating element is secured to the driven shaft to rotate therewith, namely the friction disk 23 which is splined to the driven shaft 19 by means of the sleeve 24. I have placed the rotatably journaled sleeve 43 between the driven shaft 19 and the collar 42 to avoid a frictional driving engagement between the collar 42 and the driven shaft 19, as the spiral spring 47 tends to rotate the collar 42 in unison with the disk 15. If the construction were such that the collar 42 contacted or was rotatably journaled upon the driven shaft 19, the collar 42 would tend to rotate the driven shaft 19 after the driving connection between the crank shaft 10 and driven shaft 19 had been broken. The introduction of the ball bearing 44 between the collar 42 and the sleeve 43 mitigates any tendency of the collar 42 to drive the sleeve 43, and hence the driven shaft 19 when the frictionally engageable members of the clutch are in disenagaged positions. At the same time the sleeve 43 acts as a brake on the shaft 19 when the clutch is thrown out, as described above.

I have learned that with this construction any change speed gearing associated with the driven shaft 19 may be easily and quickly manipulated directly after the clutch is thrown out, as the absence of contact by the driven shaft 19 with any part of the clutch, which tends to be continuously rotated with the crank shaft 10 whenever the crank shaft 10 is rotated, lessens the inertia of the driven shaft 19 and permits it to come to rest within a comparatively short period of time after the clutch is thrown out.

A detail of construction of my improved friction clutch, adding to the compactness of the clutch and reducing the weight of the clutch, is the design of the several levers 32 which, as shown in the drawing, are "straight" levers and not of the bell-crank type. By employing levers 32 of the design illustrated and described, the distance between the frictionally engaged surface of the fly wheel 13 and the disk 15 is reduced to a minimum.

Also a substantial advantage is gained by casting the annular flange 14 integral with the fly wheel 13, as the annular flange 14 may perform a portion of the function of the fly wheel and at the same time provide means especially adapted for establishing a driving connection between the fly wheel 13 and the ring 26, as well as providing means for carrying the disk 15.

The sleeve 43 is journaled upon the driven shaft as stated, but nevertheless has close contact therewith throughout its circumference, as plainly shown in the drawing and as now described in the specification. When the clutch is thrown in and both shafts are revolving at the same speed, obviously the sleeve 43 will rotate with the driven shaft because of this contact. When, however, the throwout lever 50 is brought into contact with the sleeve, its rotation is stopped, while that of the shaft continues. Therefore, it is believed obvious that the sleeve must act as a brake.

While I have shown my improved friction clutch as comprising a pair of friction rings 30 and 31, it is to be understood that I may replace, in some instances, the friction rings with any suitable friction material which may be secured to the friction disk 23 in any suitable manner and that this change may be made without departing from the spirit of my invention.

I am aware that changes in the form, construction and arrangement of parts may be made without departing from the spirit and without sacrificing the advantages of the invention and I reserve the right to make all such changes as fairly fall within the scope of the following claims.

I claim:

1. In a friction clutch, the combination of a driving element, a driven shaft, a driven element rotatable with said driven shaft and movable longitudinally thereof, means carried by the driving element embracing the driven element, a thrust ring, a sleeve rotatably journaled upon the driven shaft, a collar rotatably journaled upon said sleeve, means operatively connecting said collar with said thrust ring, and yielding means disposed without the embracing means and cooperating with said collar for causing said connecting means to hold the driving and driven elements in frictional engagement.

2. In a friction clutch, the combination of a driving element, a driven shaft, a driven element adapted to rotate said driven shaft and movable longitudinally thereof, pivotal means for bringing the driven element into frictional engagement with the driving element, means carried by the driving element for embracing said driven element and said pivotal means, a sleeve rotatably journaled upon said driven shaft, a collar rotatably journaled upon said sleeve, said collar engaging said pivotal means, and yielding means disposed without the embracing means and cooperating with said collar for causing said pivotal means to hold the driving and driven elements in frictional engagement.

3. In a friction clutch, the combination with a driving element, a driven shaft, a driven element adapted to rotate said driven shaft and movable longitudinally thereof, a thrust ring, friction material interposed between the driving element and the driven element and between the driven element and the thrust ring, pivotal means operatively engaging the thrust ring, means carried by the driving element for embracing the friction material, driven element, thrust ring and the pivotal means, a sleeve rotatably journaled on the driven shaft, a collar rotatably journaled upon the sleeve and adapted to operatively engage said pivotal means, and yielding means disposed without said embracing means and cooperating with said collar for causing the pivotal means to hold the driving and driven elements in frictional engagement.

4. In a friction clutch, the combination of a driving element, a driven shaft, a driven element adapted to rotate said driven shaft and movable longitudinally thereof, a thrust ring, friction rings interposed between the driving element and the driven element and between the driven element and the thrust ring, cammed thrust seats formed upon the thrust ring, pivotal means engaging said cammed thrust seats, means rotated by the driving element for supporting said pivotal means, means carried by the driving element for embracing the friction rings, the driven element, the thrust ring, the pivotal means and said supporting means, means for angularly adjusting said supporting means with respect to the thrust ring, a sleeve rotatably journaled upon the driven shaft, a collar rotatably journaled upon said sleeve, an anti-friction bearing between said collar and said sleeve, yielding means disposed without the embracing means and cooperating with said collar for holding the driving and driven elements in frictional engagement, and operating means engaging said sleeve.

5. In a friction clutch, the combination of a driving element, a driven shaft, a driven element adapted to rotate said driven shaft and movable longitudinally thereof, a thrust ring, cammed thrust seats formed upon the thrust ring, pivotal means engaging said cammed thrust seats means rotated by the driving element for supporting said pivotal means, means carried by the driving element, for embracing the driven element, thrust ring, the pivotal means and said supporting means, means for angularly adjusting said supported means with respect to the thrust ring, a sleeve rotatably journaled upon the driven shaft, a collar rotatably journaled upon said sleeve, and yielding means disposed without the embracing means and cooperating with said collar for causing said pivotal means and said thrust ring to hold the driving and driven elements in frictional engagement.

6. In a friction clutch, the combination of a driving element, a driven shaft a driven element rotatable with said driven shaft and movable longitudinally thereof, a sleeve rotatably journaled upon the driven shaft, a collar rotatably journaled upon said sleeve, an anti-friction bearing between said collar and sleeve, a thrust ring, means operatively connecting said collar with said thrust ring, yielding means engaging said collar for causing said connecting means to hold the driving and driven elements in frictional engagement, operating means engaging said sleeve, and means forming a chamber, said yielding means being disposed outside said chamber and said collar being disposed partially within and partially without said chamber.

7. In a friction drive the combination with a driving element, of a driven shaft, a friction disk mounted on the driven shaft to rotate therewith and movable longitudinally thereof, a thrust ring rotatable with the driving element and movable longitudinally thereof, a cammed thrust seat formed upon the thrust ring, a second ring mounted to rotate with the driving element, means for angularly adjusting the second ring with respect to the driving element, a lever pivotally secured to the second ring and adapted to move the thrust ring to establish frictional engagement between the friction disk and driving element, a sleeve rotatably journaled upon the driven shaft, a collar rotatably journaled upon the sleeve and engaged by the lever, means disposed between the driving element and the sleeve for yieldingly forcing the collar and sleeve in a direction away from the driving element, the collar and sleeve being adapted to move as a unit longitudinally of the driven shaft, and means for forcing the sleeve toward the driving element.

8. In combination, a driving shaft a driven shaft, a clutch to operatively connect said shafts, a sleeve on said driven shaft, a collar surrounding said sleeve, an anti-friction bearing between said collar and sleeve, connections between said collar and said clutch to control said clutch, means to engage said sleeve to throw said clutch out of operation, and a yielding element disposed about said bearing and partially within the plane of said bearing, engagement of said means with said sleeve causing said sleeve to act as a brake upon said driven shaft.

9. In combination, a driving shaft, a driven shaft, a friction disk carried by said driven shaft, a flywheel carried by said driving shaft and contacting with said disk, a thrust ring engaging said disk and having cammed thrust seats thereon an embracing element carried by the flywheel, radially disposed levers carried by said flywheel and pivoted between their ends thereon, and means disposed without said embracing element to resiliently urge an end of each of said levers into engagement with one of said thrust seats.

10. In combination, a driving shaft, a flywheel thereon, a driven shaft, a friction disk carried by said driven shaft and adapted to contact with said flywheel, a thrust ring on the opposite side of said disk, a collar mounted on said driven shaft, radially disposed levers carried by said flywheel and pivoted between their ends, one end of each lever engaging said thrust ring and the other engaging said collar, an embracing element carried by the flywheel, and a spring disposed outside said embracing element between said flywheel and said collar to resiliently urge said thrust ring toward said flywheel.

11. In a clutch, a driving shaft, a flywheel thereon, a driven shaft, a friction disk carried by said driven shaft and adapted to contact with said flywheel, a thrust ring on the opposite side of said disk, a collar mounted on said driven shaft, an embracing element carried by the flywheel, radially disposed levers carried by said flywheel and pivoted between their ends, one end of each lever engaging said thrust ring and the other engaging said collar, and a spring between said flywheel and said collar disposed without said embracing element to resiliently urge said thrust ring toward said flywheel, a sleeve between said collar and said driven shaft, and a throw-out lever adapted to engage said sleeve to throw out said clutch, said sleeve acting as a brake upon said driven shaft when the clutch is thrown out.

12. In combination, a driving shaft, a driven shaft, a clutch comprising a friction disk, a thrust ring engaging said disk and having cammed thrust seats thereon, radially disposed levers carried by said driving shaft and pivoted between their ends, an embracing element carried by the driving shaft, one end of each lever being in contact with one of said seats, and means disposed without said embracing element and resiliently acting on the other ends of said levers and tending to throw said clutch in.

13. In combination, a driving shaft, a driven shaft, a clutch comprising a friction disk, a thrust ring engaging said disk, radially disposed levers carried by said driving shaft and pivoted between their ends, one end of each lever being in contact with said ring, embracing means carried by the driving shaft, means disposed without said embracing means resiliently acting on the other ends of said levers and tending to throw said clutch in, means to throw said clutch out, and a brake for said driven shaft operated by said throw-out means.

14. In combination, a driving shaft, a driven shaft, means to operatively connect said shafts, radial levers to operate said means, and a spring to control said levers, a member embracing said levers, said spring being in the form of a flattened cone and disposed without said embracing member disposed substantially parallel to said levers and an angularly adjustable support for said levers.

15. In combination, a driving shaft, a driven shaft, a housing carried by said driving shaft and receiving the end of said driven shaft, means within said housing to operatively connect said shafts, radially disposed levers within said housing and adapted to operate said means, and a spring on the outside of said housing substantially parallel to said levers and adapted to operate the same and an angularly adjustable support for said levers.

16. In combination, a driving shaft, a driven shaft, a housing on said driving shaft to receive the end of said driven shaft, means within said housing to operatively connect said shafts, radial levers to operate said means and pivoted between their ends on the inside of said housing, an angularly adjustable support for said levers, a collar on said driven shaft extending through a wall of said housing and engaging said levers, and a coiled spring outside the housing and between said housing and said collar and substantially parallel with said levers.

17. In combination, a driving shaft, a driven shaft, a housing on said driving shaft to receive the end of said driven shaft, means within said housing to operatively connect said shafts, radial levers to operate said means and pivoted between their ends on the inside of said housing, a collar on said driven shaft extending through a wall of said housing and engaging said levers, a coiled spring between said housing and said collar and substantially parallel with said levers, a sleeve between said collar and said driven shaft, said spring normally retaining said means in operative position, and a throw-out lever for said means adapted to engage said sleeve, engagement of said lever with said sleeve braking said driven shaft.

18. In combination a driving shaft, a flywheel thereon, a driven shaft, a friction disk carried by said driven shaft and adapted to contact with said flywheel, a thrust ring engaging said disk and having cammed thrust seats thereon, a plate carried by said flywheel, levers pivoted on said flywheel and each having one end contacting with a thrust seat, a collar disposed on said driven shaft, a spring between said plate and said collar and disposed on the opposite side of said plate from said levers, and means to shift said collar.

19. In combination, a driving shaft, a driven shaft, a friction disk carried by said driven shaft, a flywheel carried by said driving shaft and contacting with said disk, a thrust ring engaging said disk and having cammed thrust seats thereon, a plate carried by said flywheel, radially disposed levers pivoted between their ends between said flywheel and said plate and having their outer ends contacting with said thrust seats, a collar slidably mounted on said driven shaft and engaging the inner ends of said levers and a spring disposed on the side of said plate opposite said levers and engaging said collar and said plate, and means to shift said collar.

20. In combination, a driving shaft, a driven shaft, a friction disk carried by said driven shaft, a flywheel carried by said driving shaft and contacting with said disk, a thrust ring engaging said disk and having cammed thrust seats thereon, a plate carried by said flywheel, radially disposed levers pivoted between their ends between said flywheel and said plate and having their outer ends contacting with said thrust seats, a collar slidably mounted on said driven shaft and engaging the inner ends of said levers and a spring disposed on the side of said plate opposite said levers and engaging said collar and said plate, said spring being in the form of a flattened cone disposed substantially parallel to said levers.

DAVID E. GAMBLE.